US011896114B2

United States Patent
Katzarov (10) Patent No.: US 11,896,114 B2
(45) Date of Patent: Feb. 13, 2024

(54) SYSTEM FOR MANAGING HAIR CONDITION INFORMATION AND METHOD FOR OPTIMIZING A COSMETIC CONSULTATION SYSTEM

(71) Applicant: Henkel AG & Co. KGaA, Duesseldorf (DE)

(72) Inventor: Jordan Katzarov, Duesseldorf (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 241 days.

(21) Appl. No.: 16/628,849

(22) PCT Filed: Jul. 2, 2018

(86) PCT No.: PCT/EP2018/067800
§ 371 (c)(1),
(2) Date: Jan. 6, 2020

(87) PCT Pub. No.: WO2019/007902
PCT Pub. Date: Jan. 10, 2019

(65) Prior Publication Data
US 2020/0221854 A1  Jul. 16, 2020

(30) Foreign Application Priority Data
Jul. 7, 2017  (DE) .................. 10 2017 211 596

(51) Int. Cl.
*G01N 21/3563* (2014.01)
*G01N 21/359* (2014.01)
(Continued)

(52) U.S. Cl.
CPC ......... *A45D 44/005* (2013.01); *G01N 21/359* (2013.01); *G01N 21/3563* (2013.01);
(Continued)

(58) Field of Classification Search
CPC ........... A45D 44/005; A45D 2044/007; G01N 21/3563; G01N 21/359; G01N 21/84; G01N 2021/8444; G01N 21/25
See application file for complete search history.

(56) References Cited

U.S. PATENT DOCUMENTS 7,304,739 B2 * 12/2007 Grossinger ............ G01N 21/84
356/402
7,463,356 B2 * 12/2008 Grossinger .......... A45D 44/005
356/402
(Continued)

FOREIGN PATENT DOCUMENTS

EP  1629775 A1  3/2006
JP  H09204138 A  8/1997
(Continued)

OTHER PUBLICATIONS

EPO, International Search Report issued in International Application No. PCT/EP2018/067800, dated Oct. 15, 2018.
(Continued)

*Primary Examiner* — Christine S. Kim
(74) *Attorney, Agent, or Firm* — Lorenz & Kopf, LLP (57) ABSTRACT

Systems for managing hair condition information and methods for optimizing a cosmetic counseling system are provided. In an embodiment, the system comprises: a sensor for determining an item of hair condition information for a user, a memory configured to store the item of hair condition information, and a processor configured to update at least one item of hair condition information in the memory based on a discrepancy between an item of hair condition information for a user determined by using the sensor after a hair treatment and a predicted item of hair condition information for the user.

11 Claims, 5 Drawing Sheets

(51) Int. Cl.
*G01N 21/84* (2006.01)
*A45D 44/00* (2006.01)

(52) U.S. Cl.
CPC ....... *G01N 21/84* (2013.01); *A45D 2044/007* (2013.01); *G01N 2021/8444* (2013.01)

(56) References Cited

U.S. PATENT DOCUMENTS

| | | | |
|---|---|---|---|
| 7,877,294 | B2 | 1/2011 | Inzinna, Jr. |
| 11,172,873 | B2 * | 11/2021 | Purwar ................ A45D 44/005 |
| 2002/0010556 | A1 | 1/2002 | Marapane et al. |
| 2005/0256733 | A1 | 11/2005 | Nagai et al. |
| 2006/0195300 | A1 * | 8/2006 | Grossinger .............. A61Q 5/10 702/190 |
| 2006/0281994 | A1 * | 12/2006 | Miyamae ........... G01N 21/3563 600/473 |
| 2007/0265867 | A1 | 11/2007 | Lin |
| 2012/0075331 | A1 * | 3/2012 | Mallick ................ G06V 40/162 345/594 |
| 2014/0118521 | A1 * | 5/2014 | Conti ..................... G01J 3/0264 348/77 |
| 2017/0119130 | A1 * | 5/2017 | Witchell .............. A45D 44/005 |
| 2021/0068744 | A1 * | 3/2021 | Katzarov ............. A61B 5/0059 |

FOREIGN PATENT DOCUMENTS

| | | |
|---|---|---|
| JP | 2003533283 A | 11/2003 |
| JP | 2003536303 A | 12/2003 |
| JP | 2005143655 A | 6/2005 |
| JP | 2012081518 A | 4/2012 |
| JP | 2014510099 A | 4/2014 |
| JP | 2014180187 A | 9/2014 |
| WO | 2017077498 A1 | 5/2017 |
| WO | 2018219895 A1 | 12/2018 |
| WO | WO-2021120152 A1 * | 6/2021 ......... G01N 21/3554 |

OTHER PUBLICATIONS

Sajja et al: "Knowledge-Based Systems for Development," Advanced Knowledge Based Systems: Models, Applications & Research, TMRF e-Book, vol. 1, p. 1-11, Series 2010.

* cited by examiner

SYSTEM FOR MANAGING HAIR CONDITION INFORMATION AND METHOD FOR OPTIMIZING A COSMETIC CONSULTATION SYSTEM

CROSS-REFERENCE TO RELATED APPLICATION

This application is a U.S. National-Stage entry under 35 U.S.C. § 371 based on International Application No. PCT/EP2018/067800, filed Jul. 2, 2018, which was published under PCT Article 21(2) and which claims priority to German Application No. 10 2017 211 596.3, filed Jul. 7, 2017, which are all hereby incorporated in their entirety by reference.

TECHNICAL FIELD

The present disclosure relates to a system for managing hair condition information and to a method for optimizing a cosmetic counseling system.

BACKGROUND

In the field of cosmetic hair treatment, static data systems are known which provide information for users or clients based on data which has been populated only once. The information which is provided is static. The systems are capable of identifying information from a data repository as a function of user-specific inputs in conjunction with a memory and to provide the user with information regarding a hair shade, for example.

A method is known, for example, in which a user is assisted when selecting a hair shade before a colouring process. Based on their hair colour which has already been measured, the system can provide a static prediction of the hair colour which will be obtained after treating their hair with a hair colouring product.

However, the system operates with static reference hair colours as starting colours which can be compared with the user's hair colour before colouring the hair, and static target hair shades. Consequently, an actual hair colour for a user which lies between two flanking hair reference colours will not categorize their actual hair colour appropriately, but might allocate it a similar reference hair colour which might differ from it by a shade. Consequently, this leads to inaccuracies when specifying corresponding target hair colours. The user will be presented with a reference hair colour which is in the system as the hair condition result after the hair treatment. This means that a predicted hair condition result could be distorted, which could result in user dissatisfaction. Furthermore, known systems are not designed to determine a difference between a predicted hair colour value and an actual hair colour value determined after a hair treatment and to optimize its user-specific information which is to be given to the user as a function of the determined difference.

Consequently, there is a demand for a system which updates stored hair condition information, for example a hair shade of users, as a function of actually achieved hair colour results, and for a method by which the predicted hair condition information, for example a prediction of an appearance of the user's hair, may be optimized or made more accurate. Furthermore, other desirable features and characteristics will become apparent from the subsequent detailed description and the appended claims, taken in conjunction with the accompanying drawings and the foregoing technical field and background.

BRIEF SUMMARY

Systems for managing hair condition information and methods for optimizing a cosmetic consultation system are provided herein. In accordance with an exemplary embodiment, a system for managing hair condition information comprises a sensor for determining an item of hair condition information for a user, a memory configured to store at least the item of hair condition information, and a processor. The processor is configured to update at least one item of hair condition information in the memory based on a discrepancy between the item of hair condition information for a user after a hair treatment determined by using the sensor and a predicted item of hair condition information for the user.

In accordance with another exemplary embodiment, a method for optimizing a cosmetic counseling system is provided. The method comprises determining an item of hair condition information for a user by using a sensor before and after a hair treatment. A discrepancy between a predicted item of hair condition information based on the item of hair condition information for the user determined by using the sensor before the hair treatment and the item of hair condition information for the user determined by using the sensor after the hair treatment is determined. Based on the determined discrepancy, at least one of the items of hair condition information used to determine the predicted hair condition is updated in a memory.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the system for managing hair condition information or the method for optimizing a cosmetic consultation system. Furthermore, there is no intention to be bound by any theory presented in the preceding background or the following detailed description.

The term "digital image" as used herein should be understood to mean a data packet which may be represented by a data processing system as a two-dimensional (flat surface) arrangement of image points, for example in a coordinate system which has an x axis and a y axis, wherein each image point is associated with at least one item of colour information which, for example, may be represented as a colour of a pixel on a monitor or a printed dot of a printed image. In this regard, the digital image may, for example, be a photograph recorded using a digital camera or an individual image of a video sequence recorded with a digital camera.

The terms "hair region" and "hair region area" are used synonymously herein. The hair region may comprise a plurality of image points of a digital image which images the hair and which may form a coherent area or an area formed from a plurality of individual areas. A plane in which the hair region may be disposed may, for example, be specified by the x axis and the y axis of the digital image.

The term "colour" as used herein should be understood to mean the interaction of a shade (i.e. a spectral colour impression, also known as the hue, which should be understood to mean what is seen as the "real colour"), a colour intensity (i.e. how intense the colour appears, for example compared with a neutral grey, also described as saturation, colour saturation, colourfulness, chromaticity, or depth of colour) and a brightness (i.e. how light or dark the colour appears).

In various exemplary embodiments, the colour information may, for example, comprise a parameterization in a known colour space, for example in a L*a*b* colour space (wherein L* gives the brightness of a colour, a* gives the percentage green and red and b* gives the percentage blue and yellow of the colour), in a RGB colour space by employing red, green and blue colour percentages, in a CMYK colour space using cyan, magenta, yellow and black colour percentages, or in any other colour space.

The term "shade" as used here should be understood to mean the spectral colour impression of a colour, independently of how it may be parameterized, for example as a point in a two-dimensional colour space (for example a*b* in the L*a*b* system) or a ratio of colour percentages (for example in the RGB colour space or in the CMYK colour space).

In various exemplary embodiments, a colour space from which the colour information derives (hair colour information and image colour information) may be generated in a manner such that a determined or represented colour is independent of a medium through which the colour is determined or represented (for example screen, printer, scanner, human eye, etc.). The colour space may, for example, be a L*a*b* colour space, and the colour information may, for example, be a shade parameterized by a* and b*. The unique representation in the medium-independent colour space means that a colour response may be presented that is close to reality.

In accordance with an exemplary embodiment, an optimized cosmetic counseling system is provided.

The cosmetic counseling system may be configured as a learning cosmetic counseling system.

In an embodiment, it is possible to compare a predicted hair condition by employing a re-measurement of the actual hair condition after a treatment of the user's hair.

In an embodiment, it is possible to determine a discrepancy between an item of hair condition information stored in the system and an actual condition of a user's hair after a hair treatment.

In an embodiment, an efficient counseling system is provided that can update a database system that is provided for storing user-specific hair condition information by employing a difference in an item of hair condition information which may be detected after a treatment of a user's hair.

In accordance with an exemplary embodiment, a system for managing hair condition information is provided. The system may comprise: at least one sensor for determining an item of hair condition information for a user, a memory, wherein the memory is configured to store at least the item of hair condition information, and a processor, wherein the processor is configured to update at least the hair condition information in the memory based on a discrepancy between the item of hair condition information for the user determined by the sensor after a hair treatment and a predicted item of hair condition information for the user.

The memory may comprise a server, a database or a cloud. Information in the memory, for example in the form of data, may be output, input or replaced with updated data or deleted. As an example, the memory may be an onboard database device in which personalized or user-specific information regarding hair conditions and general information regarding hair treatment products could be stored. Furthermore, the memory may comprise information which allows a user, before a hair treatment, for example with a hair treatment product from Schwarzkopf®, to determine the identity of the user. The term "hair condition before a hair treatment" may also be designated as the starting hair condition. The term "hair condition after a hair treatment by dyeing or colouring, bleaching or after a treatment of hair with a cosmetic hair treatment product" may also be designated as the hair condition result.

In the memory, information for existing users already filed in the database system can be managed and appropriate information for new users can be filed. Furthermore, the information stored or filed in the memory can be accessed by a processor. The processor can be configured in a manner such that the information captured with the sensor or data recorded in the memory can be stored and it can access the stored information or the stored data.

As an example, the memory may be a big data memory, for example a data server, a cloud server, a constant information miner server (KNIME server) or a big data KNIME server.

The system may comprise a data management system. Furthermore, the system may comprise an algorithm or a computational model or a software program which may, for example, be executed by a processor. As an example, the algorithm may be stored in a processor or in a memory of a mobile device such as, for example, a smartphone, a tablet or in a stationary device such as, for example, a cloud or a smart mirror.

Advantageously, the system can be optimized by updating the information stored in the memory and used for predicting hair conditions. In this manner, an optimized prediction of possible target hair colours based on desired hair shades selected by a user is obtained, for example during a hair colouring procedure or during a hair bleaching procedure.

Furthermore, advantageously, a system for managing hair condition information learns by updating its internally stored data via hair treatments which have already been carried out on users, in which relevant hair condition information memory values in the memory are updated based on hair conditions measured after a hair treatment. In this manner, by employing the management system, a more accurate prediction, for example of a target hair colour for a user, may be determined than was previously the case. Furthermore, the performance of the management system may be improved.

Furthermore, user or client satisfaction may be enhanced when using cosmetic hair treatment products, for example Schwarzkopf® hair treatment products.

Furthermore, knowledge regarding hair shade values which arises from many types of natural hair, for example as the hair colour result or hair bleaching result after a hair treatment, may be archived in and recalled from a memory.

In an exemplary embodiment, the hair condition information comprises a degree of damage to the hair and/or a hair shade. The degree of damage to the hair may, for example, be given using a scale of from 0 to about 10, or from 0 to about 100, from minor to medium to severe, for a strand of hair or a fibre of hair from a user. The degree of damage to the hair may, for example, comprise information regarding the condition of the hair cuticle (cuticula), the medulla of the hair shaft and the cortex of the hair shaft, etc. As an example, the degree of damage to the hair may comprise external damage and/or internal damage to the hair. Thus, for example, a degree of damage could be influenced by a daily hair treatment, hair washing, brushing, a heat treatment, chemical treatments, environmental factors, etc.

A hair shade or a hair colour value may, for example, be given as a L* a* b* colour value in a L* a* b* colour space and stored in a memory. Furthermore, the hair shade may be given as a RGB colour value in a RGB colour system or as a CMYK colour value in a CMYK colour system. The hair shade may include colour information, for example a shade parameterized by a* and b*.

Clearly, however, the hair condition information is not limited to a degree of damage to the hair and/or to a hair shade, but may comprise other hair condition information. Thus, in various exemplary embodiments, the sensor may, for example comprise a hair brush equipped with a sensor or a hair comb fitted with a sensor. The hair brush or the hair comb may comprise sensors for measuring forces which occur at the bristles of the hair brush or at the teeth of the comb. The forces measured when brushing or combing the user's hair could be stored in an internal memory in the brush or the comb, for example, or be transferred via a wired or wireless connection to the memory. Thus, by employing the system, hair condition information regarding, for example, the smoothness of the hair or the combability of the hair may be determined.

In various exemplary embodiments, the sensor may comprise a near-infrared spectroscopy sensor (NIR sensor) and/or a camera and a colour calibration device.

According to an exemplary embodiment, a level of damage to the hair, also denoted here as the degree of damage to the hair, is determined by a molecular sensor or near-infrared spectroscopy sensor (NIR sensor). An internal or inner degree of damage to the hair, for example, may be determined using the NIR sensor. In NIR sensor technology, molecular vibrations in the near-infrared region can be excited by electromagnetic radiation. The near-infrared region is approximately in the range from about 780 to about 3000 nm. The near-infrared region may be divided into a short wavelength region of from about 780 to about 1400 nm and into a long wavelength region in the range from about 1400 nm to about 3000 nm. In NIR spectroscopy, interactions of electromagnetic radiation with hair can be measured and a conclusion regarding the level of absorption or a degree of reflection may be obtained. Thus, for example, different components of hair may be discerned qualitatively or quantitatively from the absorption spectra. Furthermore, an assessment of the surface scattering effects may be used to measure material properties of the hair such as the roughness of the hair, for example. Furthermore, an interference pattern produced by boundaries may be used in the spectra to determine the thickness of the layers in the hair. NIR spectroscopy is particularly suitable for determining a water content, an amino acid content, a protein content or a lipid content for hair. Furthermore, NIR spectroscopy may, for example, be used to establish a fibre weight for hair. Thus, for example, a degree of penetration of light through a hair or a strand of hair can be measured in the NIR wavelength region.

Near-infrared spectroscopy can, for example, be divided into that using the reflection principle and that using the transmission principle. With reflection measurement in the case of the reflection principle, the hair can, for example, be irradiated with white halogen light. The reflected NIR fraction is detected by a NIR sensor. In the case of the transmission principle, the transmission measurement is made by passing white halogen light through the hair. The penetrating halogen light can be detected by the NIR sensor. In this manner, for example, information regarding elasticity, degree of elongation, stiffness, cross sectional area, shape or density of the hair can be determined. A NIR sensor may, for example, be used for the measurement of a moisture content of the hair. Thus, a high degree of resolution in the measurements is made possible.

Various exemplary embodiments make it possible to carry out a non-intrusive, contactless optical measurement of a degree of damage to hair of a user using a NIR sensor. In this manner, damage to hair by mechanical influences may be identified and the damage to the hair can subsequently be corrected by using appropriate care products. As an example, the NIR sensor may be integrated into a smartphone or a tablet.

In various exemplary embodiments, furthermore, a great deal of information regarding a degree of damage to the hair may be stored in the memory or in the NIR sensor, so that data which is obtained from the measured hair by the NIR sensor or from the measured strand of hair via the NIR sensor can be compared with data in the memory. Different levels of damage can be stored in the memory for different degrees of damage to the hair.

In another exemplary embodiment, the hair colour or a hair shade for a person, also described here as the user, is detected by a camera or by a camera and a colour calibration device. Any camera may be used as the camera, as long as it has a sufficient resolution for capturing a strand of hair or a single hair. The camera may be a digital camera. As an example, the camera may be a camera which is integrated into a smartphone or into a tablet.

A colour calibration device, for example in the form of a colour calibration chart or a hair calibration strand, may be used in order to be able to identify the hair colour for a user more accurately. In the case of a colour calibration chart, the colour calibration device is constituted by a range of colours, for example from light blonde via brown tones to a black, providing a plurality of hair colours. In this regard, by employing a colour calibration chart, it is possible, independently of external light influences, to obtain exact details regarding the hair shade of a user before and after a hair treatment with a cosmetic product. The term "cosmetic product" as used here may encompass a hair treatment product such as a hair care product (for example a hair treatment, a hair oil, a hair mask, a conditioner), a hair colouring agent, a hair styling agent, a hair bleaching agent, etc. When measuring the hair shade of a user using a camera, for example, not only the hair, but also another calibration means may be captured by the camera in an image in addition to the hair. The image may, for example, be a digital image. In the recorded image, a processor may, for example, detect a region of the hair or a surface of the region of the hair by employing conventional digital image analysis processes. Using conventional digital image analysis processes, a processor can compare the shades contained in the recorded image with the shades of the colour calibration device contained in the image and determine a shade which most closely resembles a shade on the colour calibration device. The shade determined using the processor may then be stored in a memory for the purposes of archiving.

In an embodiment, the sensor may be an integrated mobile sensor which has a NIR sensor, a camera and a colour calibration device. In various exemplary embodiments, a single mobile sensor, for example a VIS/NIR sensor, may be produced which can measure both a degree of damage to the hair and also a current hair shade of a user in a simple manner, rapidly and easily. In addition, a measurement of a hair shade and a measurement of a degree of damage to the hair can be carried out practically simultaneously.

In various exemplary embodiments, a practical and inexpensive colour calibration device for determining hair shades with a camera, for example a camera of a smartphone or a tablet, may be used.

Furthermore, an application, also abbreviated herein to computer app or app, may be provided for various mobile platforms, which is provided for the measurement of at least one hair shade using a camera and of a colour calibration device and to display measured hair condition information such as, for example, a determined hair shade of a user, a degree of damage to the hair of a user, an internal degree of damage to the hair of a user, possible predicted hair shades and other user-based information. The app may, for example, provide percentages or a graphical representation of a degree of damage to the hair. By employing the computer app a user may, for example, select at least one of the target hair colours desired by the user from, for example, target hair shades which are graphically displayed in the computer app. Furthermore, by employing the computer app, cosmetic hair treatment products may be ordered or replaced.

In various exemplary embodiments, the sensor may comprise additional sensors such as a NIR sensor, for example, for use in a professional hair studio or in a premium hair salon.

In an exemplary embodiment, the system furthermore comprises a display device for the representation of at least information based on the hair condition information stored in the memory. The display device may, for example, be a screen of a television, a smartphone, a tablet or a smart mirror.

A "smart mirror" can be a smart mirror per se or a mirror-signal hybrid display. It combines the advantages of a mirror with a digital display. The smart mirror may on the one hand be used as a conventional mirror; on the other hand, the smart mirror may, for example, be used as a visual presentation screen or advertising panel. As an example, the smart mirror may, because of a high degree of reflection, show visually clear real-time mirror images of a user and show supplementary content in addition to the mirror image or superimpose it on the mirror image. The smart mirror may be used during the decision-making phase during a hair treatment. A smart mirror or a plurality of smart mirrors may be installed in hairdressing salons, for example. Using the smart mirror, digital hair shades provided on the smart mirror may be overlaid virtually on the mirror image. In this regard, by employing the smart mirror, the respective desired hair shade may be laid over the mirror image and a prediction of hair colours of a user after a hair treatment which is close to reality may be made. Furthermore, the smart mirror may be used for the presentation of client-specific treatment products such as, for example, a hair shampoo, a hair mask, a hair oil or other client-specific advertising, etc. As an example, the smart mirror may be operated by a touch screen by a user and/or by a hairstylist. Furthermore, the smart mirror may be provided with a wireless connection such as WLAN or Bluetooth, for example, in order to be able to exchange data with a sensor, mobile devices such as smartphones or tablets, with a processor or a memory. The smart mirror may, for example, be controlled by a smartphone or tablet. The smart mirror may, for example, have a full image mode in which the majority of the mirror area is covered with digital information. Furthermore, the smart mirror may also be provided as a mobile device.

In various exemplary embodiments, the sensor may be positioned in a mobile device and the display device may be positioned in the mobile device and/or in a smart mirror.

As an example, the mobile device may be a smartphone, a tablet, etc. The camera of the smartphone or tablet may be configured to record at least one digital image of a user's hair. The display device may be a screen of the smartphone or the tablet. The display device may be produced as a smart mirror which can reproduce information based on the hair condition information recorded by employing the at least one sensor.

The smart mirror may be configured to show the user or a hair stylist counseling the user graphical information based on data from the memory. Furthermore, the smartphone, tablet or the smart mirror may be configured to show the user or the hair stylist additional information such as, for example, information regarding a degree of damage to the hair, dryness of the hair, the lightened condition of the hair, the current air humidity, weather forecasts, etc. Furthermore, the display device may comprise a display of possible target hair colours which may be selected by the user or hair stylist. Furthermore, the display device may comprise displaying news and trends in the field of cosmetic hair treatment products or fashions.

In various exemplary embodiments, an exchange of information between the mobile device and the memory is carried out via an application (computer app). As an example, the system may be produced by employing an application or computer app or app, or may include it. The computer app may, for example, be an iOS application, an android app etc. As an example, the computer app may be provided on a smartphone or tablet and comprise a program which gives the user text or graphical indications as to how the number is to record images by employing the camera integrated into the smartphone or tablet. Furthermore, the computer app may build a wireless connection with the memory and vice versa, so that the images of hair recorded by employing the at least one sensor or a degree of damage to the hair determined with a sensor can be transferred to the memory via the computer app. The computer app may read data stored in the memory from the memory and provide it on the mobile device via the display device. Clearly, a wired connection for the transfer of information between the mobile device and the memory may be provided. By employing the computer app, access to the memory is obtained when out and about.

In various exemplary embodiments, the processor is further configured to compare a degree of damage to the user's hair captured by the sensor before the hair treatment with a plurality of degrees of damage to the hair stored in the memory and/or to compare a hair shade for the user captured by the sensor before the hair treatment with a plurality of hair shades stored in the memory, to determine a closest degree of damage to the hair stored in the memory and/or to determine a closest hair shade and, based on the respectively determined closest degree of damage to the hair and/or on the determined closest hair shade and a desired user's hair colour, to provide a predicted hair condition and/or predicted hair shade.

The memory may store logged degrees of damage to the hair and/or hair shades or may store them in the form of suitable logged values which, for example, may respectively be associated with a user. Thus, for example, one user may be associated with a brown hair colour and a high degree of damage to the hair in the memory, another user may be associated with a black hair colour and a low degree of damage to the hair and a further user may be associated with a light hair colour and a medium degree of damage to the hair. The information or data in the memory may be read in a personalized manner and be read out in a personalized manner. Furthermore, the memory may have a plurality of possible degrees of damage to the hair and have values for possible hair shades.

By employing the system, the user may be presented with possible hair shades by the display device, so that the user may select at least one desired hair shade from a total number of possible hair shades. The user may also select a plurality of desired hair shades from the total number of possible hair shades. On the display device, the user may be presented with a selection of five predicted hair shades, for example based on five desired hair colours. However, the system is not limited to this and clearly, the system may display any number of predicted hair shades on the display device based on a total number of hair shades available to the user in the portfolio before a hair treatment.

The processor may compare the degree of damage to the hair determined by the sensor with a plurality of degrees of damage to the hair stored or memorized in the memory. As an example, the processor may individually compare the degree of damage to the hair determined by the sensor respectively with each of the plurality of degrees of damage to the hair stored in the memory until the processor has determined a degree of damage to the hair in the memory which is closest to the degree of damage to the hair determined by the sensor. The processor may select the degree of damage to the hair which is closest and store it temporarily or permanently in the memory.

The processor may, for example, compare the hair shade or hair shade value determined by the sensor respectively individually with each of the plurality of hair shades stored in the memory until the processor has determined a hair shade value in the memory which is closest to the hair shade value determined by employing the sensor. The processor may, for example, select the closest hair shade value and store it temporarily or permanently in the memory. Furthermore, the processor may compare a selected desired hair shade or desired hair shade value or selected desired hair shades or desired hair shade values with the hair shades stored in the memory, select the respectively closest hair shade in the memory and store it temporarily or permanently in the memory. The cached values may consequently be made available for subsequent calculations using the processor. The values may be cached in a memory of the processor.

Based on the closest degree of damage to the hair determined in the memory, the hair shade determined in the memory and the at least one desired hair shade selected by the user, the processor can predict or forecast at least one predicted hair condition by employing the display device, for example. The predicted hair condition of the user or the predicted hair conditions of the user may be displayed to the user by the screen on the smartphone, on the tablet or on the smart mirror.

The smart mirror may, for example, have a mirrored surface in which the user can see their mirror image. Furthermore, the smart mirror may comprise an integrated camera. An image of the respective user may be recorded by employing the camera. The user may be identified by employing facial recognition, wherein the information in the image recorded for facial recognition and the corresponding personalized information or personalized data may be recalled from the memory and compared. The personalized information may be shown on the smart mirror in a user-dependent manner. The facial recognition may be carried out using known processes, for example an analysis of characteristic visible features in the front region of the head by employing a two-dimensional facial recognition process or a three-dimensional facial recognition process.

Furthermore, based on at least one desired hair shade or based on at least one degree of damage to the hair, the system may provide the user with a personalized or user-specific cosmetic hair treatment product, for example a hair shampoo, a hair mask, a hair colouring agent, a hair oil, etc. The information determined by employing the processor and the memory may, for example, be transmitted to a dispensing station. The dispensing station can mix/produce a personalized or user-specific shampoo, a hair colouring agent, a hair mask, a hair oil etc.

Furthermore, the system may comprise a computer app and an online store. By employing the online store, the user may buy or reorder online the cosmetic hair treatment products which have already been tailored to their needs. The computer app and/or the online shop may provide the user with a suitable user manual or speech-controlled instructions for use for a respective cosmetic hair treatment product. These may be downloaded or consulted online.

In another exemplary embodiment, the processor furthermore is configured to determine a discrepancy between a hair shade before a hair treatment, determined by employing a sensor, or a predicted hair shade before a hair treatment with a hair shade after a hair treatment determined by employing a sensor, by comparing respectively associated hair colour values.

The discrepancy may be a difference in shade or in colour. The hair shade before the hair treatment determined by employing the sensor may, for example, be subtracted from the hair shade after a hair treatment determined by employing the sensor, in order to be able to identify a discrepancy.

In various exemplary embodiments, the predicted hair shade before a hair treatment may be subtracted from the hair shade after a hair treatment determined by the sensor in order to be able to identify a discrepancy in these values. The hair shade used for the prediction of the at least one desired hair shade may be corrected by an identified discrepancy.

In various exemplary embodiments, the information used for a prediction of a hair shade may be optimized in the memory. Furthermore, the cosmetic counseling system used for user-specific counseling may optimize its stored hair condition information or its data archived in a memory with each user who is treated, because a prognosis may be improved by comparing the hair conditions. Furthermore, an effectivity of the personalized cosmetic counseling system may be enhanced. Furthermore, the personalized cosmetic counseling system can optimize predictable hair condition information every time a user is counseled. By using the system many times to carry out user-specific cosmetic counseling, different hair shades can be taken into account or a plurality of predicted hair shades can be filed in the memory. The system allows users of the system to benefit from results from previous users of the system. As a consequence, the user can benefit from previous care programs and measurements carried out on the hair of other users. Furthermore, by employing the cosmetic counseling system, a comprehensive database can be generated which is not based on static hair condition information, but on real measured hair condition information.

In various exemplary embodiments, the processor may be further configured such that the hair condition information for the user captured by employing the sensor is allocated to the respective user in the memory.

In various exemplary embodiments, a history of degrees of damage to the hair and hair shades relating to a user may be generated. Based on the information about the hair of each individual user stored over a certain time period, a treatment response for the hair over that time may be obtained. Static evaluations based on the hair condition information for each user may also be carried out individually and for the totality of the users.

In accordance with another exemplary embodiment, a method for optimizing a cosmetic counseling system is provided. The method may comprise: a determination of at least one item of hair condition information for a user by employing at least one sensor before and after a hair treatment, a determination of a discrepancy between a predicted item of hair condition information based on the hair condition information for the user determined by employing the sensor before the hair treatment and between the hair condition information for the user determined by employing the sensor after the hair treatment, and based on the determined discrepancy, updating at least one of the items of hair condition information used to determine the predicted hair condition in a memory.

In various exemplary embodiments, in order to determine a condition of a user's hair before a hair treatment and in order to determine a condition of a user's hair after a hair treatment, only one sensor may be employed.

In various exemplary embodiments, over time, a constantly improving prognosis may be delivered relating to a predicted appearance of the hair.

In various exemplary embodiments, the method may further comprise a comparison of the hair condition information for the user determined by employing the sensor before the hair treatment with the hair condition information for the user chronologically after the hair treatment.

In various exemplary embodiments, the user may compare a condition of their hair before a hair treatment with a condition of their hair after a possible hair treatment. In this manner, the user can better establish the response to the hair treatment.

In various exemplary embodiments, the determination of an item of hair condition information for the user may comprise a determination of a degree of damage to the hair by employing a NIR sensor and/or a determination of a hair shade for the user by employing a camera and a colour calibration device.

In various exemplary embodiments, the determination of an item of hair condition information for the user may comprise a determination of a degree of damage to the hair by employing a NIR sensor and/or a determination of a hair shade for the user by employing a photometer.

In various exemplary embodiments, the determination of an item of hair condition information for the user may comprise a determination of a degree of damage to the hair and/or a determination of a hair shade for the user by employing a VIS/NIR sensor.

In various exemplary embodiments, by using a NIR sensor, a non-intrusive, contactless optical measurement of a degree of damage to the hair of a user may be obtained. In this manner, degrees of damage to the hair, for example by mechanical influences, may be identified and damage to the hair may be sustainably corrected.

In an embodiment, the determination of the predicted hair condition information comprises: a determination of a degree of damage to the hair of the user before the hair treatment and/or a determination of a hair shade for the user before the hair treatment, a comparison of the determined degree of damage to the hair with at least one of a plurality of degrees of damage to the hair stored in the memory and/or a comparison of the determined hair shade with at least one of a plurality of hair shades stored in the memory, a determination of a closest degree of damage to the hair and/or a closest hair shade which are stored in the memory, and a provision of a predicted hair shade based on the respectively determined closest stored degree of damage to the hair and/or based on the determined closest stored hair shade and/or based on a predetermined desired hair colour.

Thus, by comparing a hair condition after the hair treatment with a predicted hair condition, feedback regarding the quality or effectiveness of a cosmetic hair treatment product under real conditions may be obtained.

In an exemplary embodiment, the method furthermore comprises a representation of a predicted hair shade by employing a display device.

A user may be informed about hair conditions after a hair treatment in a simple and persuasive manner. The user's search and decision phases are assisted in this way, and the user is encouraged to use a cosmetic hair care product.

In various exemplary embodiments, the updating may comprise at least one update to a hair shade and/or to a degree of damage to the hair in the memory.

This means that by employing the cosmetic counseling system, predicted hair shades can be predicted with more accuracy. In this manner, the quality of the cosmetic counseling system can be improved.

In various exemplary embodiments, the effectivity of the cosmetic counseling system may be increased.

In various exemplary embodiments, by employing the cosmetic counseling system, the accuracy of the hair shade prognoses may be increased by replacing previous hair colour values with other, optimized, hair colour values.

The embodiments described above and the advantages mentioned refer to the system and to the method.

In the following description, reference will be made to the accompanying drawings that form part of the disclosure. In this regard, the orientational terminology such as "top", "bottom", "front" "rear", "forward", "rearward" etc. are used with reference to the orientation of the described figure(s). Because components of embodiments may be positioned in a number of different orientations, the orientational terminology serves for illustration purposes and is not limiting in any way. It should be understood that other embodiments may be used and structural or logical modifications may be undertaken without deviating from the scope of protection of the present disclosure.

Furthermore, it is clear that the features of the various exemplary embodiments described herein may be combined with each other, unless specifically stated to the contrary.

Figure 1:
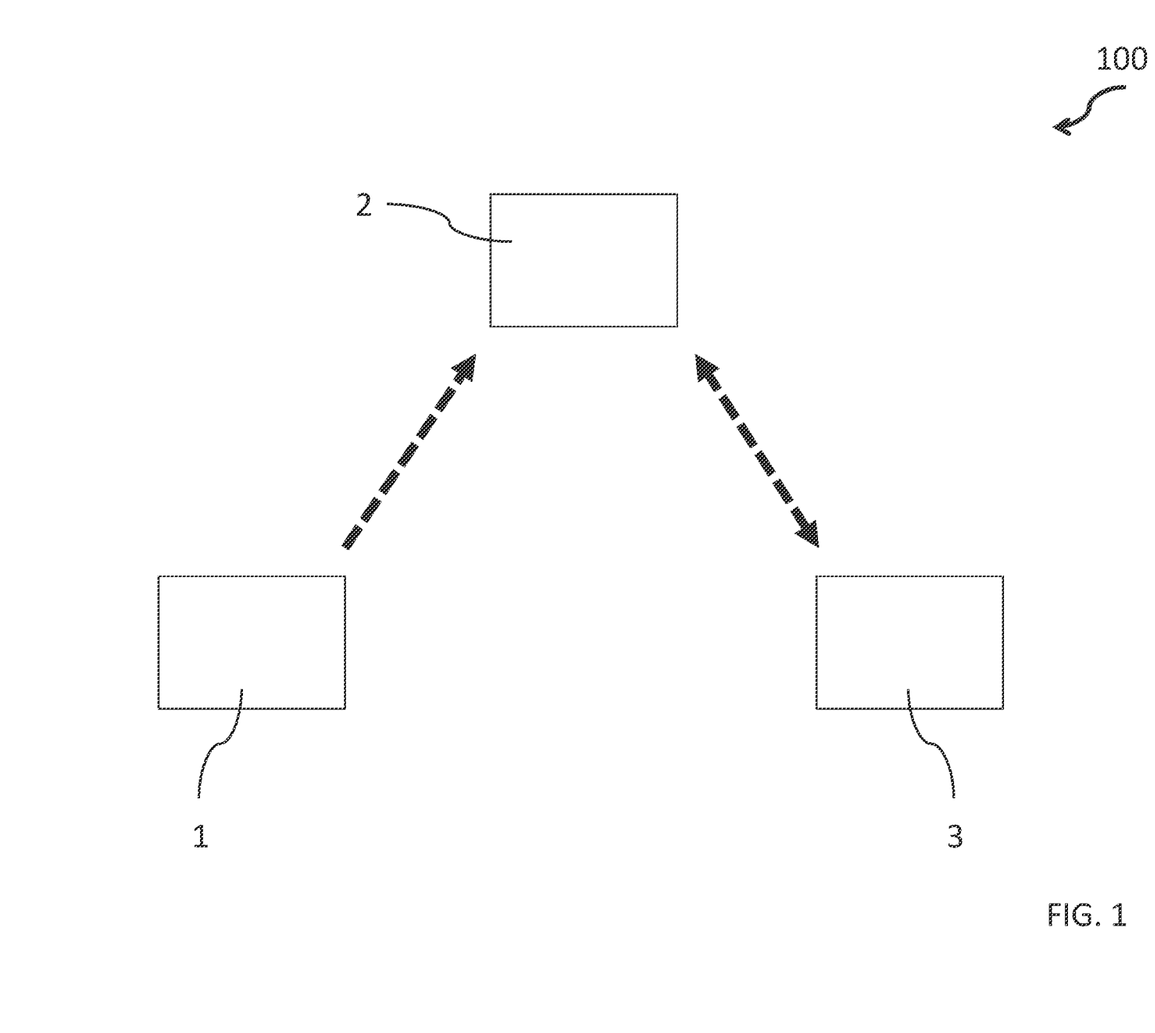
FIG. 1 shows a diagrammatic representation of a system for managing hair condition information in accordance with an exemplary embodiment.

FIG. 1 shows a diagrammatic representation of a system 100 for managing hair condition information in accordance with an exemplary embodiment.

In the embodiment, the system for managing hair condition information comprises a sensor 1. The sensor 1 may be a two-in-one sensor which may comprise a NIR sensor and a camera. Furthermore, the sensor may comprise a colour calibration device in the form of a colour calibration chart. Calibration colours may be attached to the colour calibration chart. Internal damage to the hair or a degree of damage to the hair may be analysed using a NIR sensor. Using the camera and the colour calibration chart, a hair shade of a user may be determined which is true to reality.

Alternatively, the two-in-one sensor may comprise a VIS sensor and a NIR sensor or a NIR sensor and a photometer.

In another exemplary embodiment, the system for managing hair condition information comprises a memory 2. The memory 2 may be a big data KNIME server. By using the KNIME server and employing a graphical user interface, a simple and rapid layout of modules for pre-processing data from client data may be implemented. By using a KNIME server and a big data analysis, for example, new cross-connections and trends in the field of the hair treatment product industry can be determined.

In further exemplary embodiment, the system for managing hair condition information comprises a processor 3. The processor 3 may be configured as an arithmetic logic unit, in order to write information or data into the memory 2 or to read information or data out of the memory 2.

The sensor 1 may be connected to the memory 2 by a wireless connection. In other exemplary embodiments, the connection between the sensor 1 and the memory 2 may be wired. Furthermore, the processor 3 may be connected to the memory 2 by a wireless connection. In other exemplary embodiments, the connection between the memory 2 and the processor 3 may be wired.

In an exemplary embodiment, the system 100 for managing hair condition information is provided with a processor 3 which can receive information or data from the sensor 1 and can transfer it, for example, to the memory 2, for storage in the memory 2. Furthermore, in various exemplary embodiments, the processor 3 may be provided in the memory 2. A wireless connection between the sensor 1, the memory 2 and the processor 3 may, for example, be produced by employing a WLAN, Thread, ZigBee, NFC, Wibree or Bluetooth connection. However, the present disclosure is not limited to this and any suitable wireless connection may be made.

Figure 2:
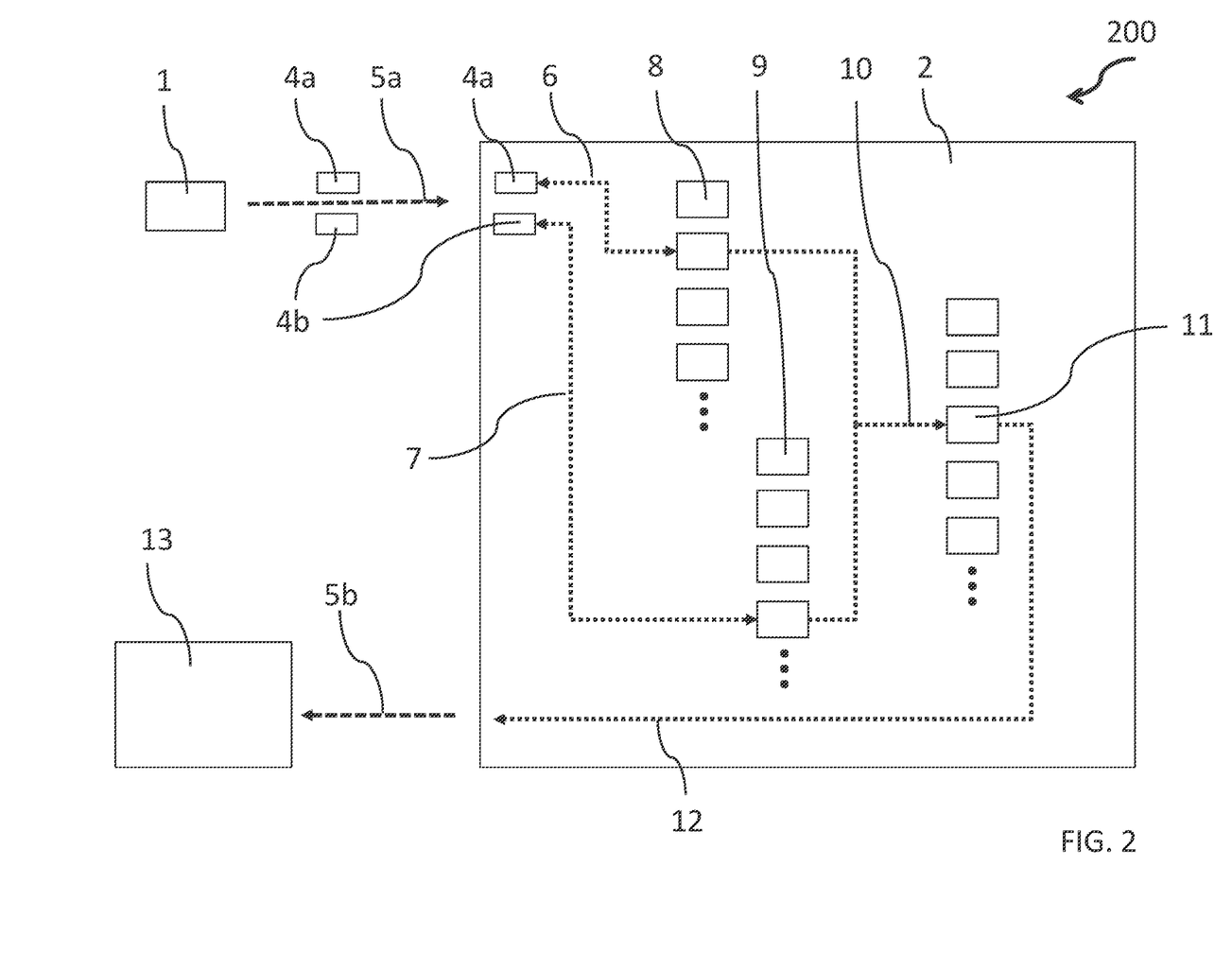
FIG. 2 shows a diagrammatic representation of a system for managing hair condition information in accordance with an exemplary embodiment.

FIG. 2 shows a diagrammatic representation of a system 200 for managing hair condition information in accordance with an exemplary embodiment.

By employing the sensor 1, a degree of damage to the hair 4a may be determined, for example by employing a NIR sensor, and/or a hair shade 4b may be determined, for example by employing a camera and a colour calibration device. In this regard, a user themselves or a hair stylist may use the sensor 1 in order to capture a degree of damage to the hair 4a and/or a hair shade 4b of a user before a hair treatment. As an example, the degree of damage 4a to the hair of a user and/or the hair shade 4b of a user may be transferred via a wireless connection 5a to the memory 2.

In the memory 2, for example, a comparison 6 of a degree of damage to the hair 4a with a degree of damage to the hair 8 of a plurality of stored degrees of damage to the hair stored in the memory 2 may be carried out. That degree of damage to the hair from a plurality of degrees of damage to the hair 8 stored in the memory 2 which comes closest to the degree of damage to the hair 4a which is determined with the sensor 1 may be determined by employing a processor and, for example, may be cached in the memory 2 or in the processor.

In the memory 2, as an example, a comparison 7 may be carried out of a hair shade 4b with a hair shade from a plurality of stored hair shades 9 stored in the memory 2. That hair shade from a plurality of hair shades 9 stored in the memory 2 which comes closest to the hair shade 4b determined by employing the sensor 1 may be determined by employing the processor and, for example, may be cached in the memory 2 or in the processor.

After a determination of an actual degree of damage to the hair 4a and/or of an actual hair shade 4b of the user by employing the sensor 1, the user or the hair stylist can select desired hair shades 11 from a plurality that are stored in the memory 2. Based on a result 10 including the determined degree of damage to the hair 8 and the determined hair shade 10 as well as on a desired hair shade 11 selected by the user, the hair shade prediction 12 can be provided, for example in the form of an image of the face of the user, with the selected desired hair colour.

The hair shade prediction 12 may, for example, be transferred to a display device 13 via a wireless connection 5b. A graphical representation of the image of the user may be displayed on the display device 13, based on the hair shade prediction 12. The display device 13 may, for example, be a screen of a smartphone, a screen of a tablet or a smart mirror. However, the present disclosure is not limited to this and other suitable display devices may be produced.

If, for example after a hair treatment on a user, a large discrepancy is observed between a predicted hair condition and a hair condition determined by employing the sensor 1 after a hair treatment, then the hair shade prediction 12 can be appropriately adapted by employing the processor. By adapting or updating the hair shade prediction 12, the system can be optimized towards a more accurate prognosis of a predicted hair colour. At least one of the items of hair condition information stored in the memory 2 may be updated in order to arrive at a better hair shade prediction 12.

Figure 3:
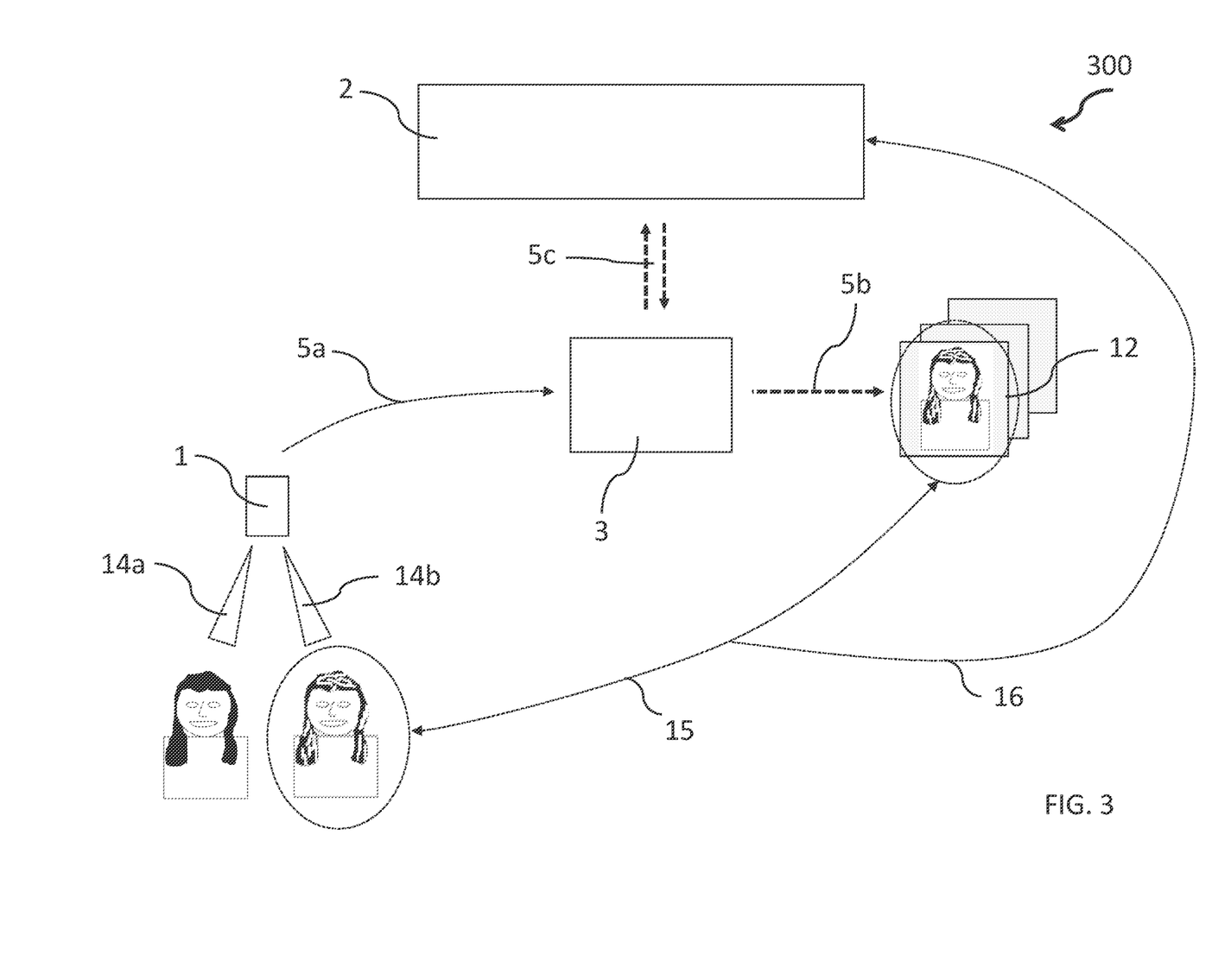
FIG. 3 shows a diagrammatic representation of a system for managing hair condition information in accordance with an exemplary embodiment.

FIG. 3 shows a diagrammatic representation of a system 300 for managing hair condition information in accordance with an exemplary embodiment.

The system 300 comprises the features of the systems 100 and 200 depicted in FIGS. 1 and 2.

In the system 300 described with respect to FIG. 3, sensor 1 may be in contact with processor 3 via wireless connection 5a and send information or data to the processor 3. Furthermore, the processor 3 may exchange information or data with memory 2 via a wireless connection 5c.

In the system 300, by recording a sensor hair condition 14a before a hair treatment on a user, an item of hair condition information is determined by employing the sensor 1. The sensor 1 may comprise a NIR sensor. At least one hair region of the user is identified by employing the NIR sensor before a hair treatment. The hair condition information captured by employing the NIR sensor may be compared with a plurality of items of information regarding the condition of the hair which are stored in the memory 2 or in a further memory which is not shown in FIG. 3.

By employing the NIR sensor, from the absorption spectra, various components or constituents of the hair may be determined qualitatively or quantitatively, for example. The respective absorption spectrum or the respective reflection spectrum may be compared using an absorption spectrum or reflection spectrum stored in the memory 2 and a corresponding absorption spectrum or reflection spectrum in the memory 2 may be determined, for example with the use of the processor 3. Specific properties of hair are, for example, assigned to the corresponding determined spectrum, for example the proportion of water in the hair, an amino acid content, a lipid content in the hair, a chemical composition of the hair, etc. After capturing the hair of the user before a hair treatment, consequently, information regarding the hair condition of the respective user based on stored data may be provided.

Furthermore, by employing the sensor 1 with a camera and a colour calibration chart, an item of hair shade information respectively before a hair treatment and after a hair treatment can be accurately captured. After a respective measurement by employing the sensor 1, a pair of items of measured data, for example a degree of damage to the hair of the user and a hair shade for the user may be determined. In various exemplary embodiments, the measured data may be determined independently of each other. The data may be allocated to the respective user in the memory 2 and stored.

In one exemplary embodiment, firstly, an item of hair condition information before a hair treatment may be determined by employing the sensor 1 and the determined information may be stored in the memory 2. Next, a predicted item of hair condition information may be provided. An item of hair condition information after a hair treatment then is determined by employing the sensor 1 and stored in the memory. Based on the predicted hair condition information and the hair condition information determined after the hair treatment in the memory 2, a comparison is carried out by employing the processor 3. However, the present disclosure is not limited in this regard and it would be obvious to the person skilled in the art that other sequences could also be carried out.

From a plurality of possible hair colour values, for example from a palette of hair colours, the user can select one or a plurality of target hair colours, for example hair shades into which they would like to have their hair coloured or bleached. Based on the determined degree of damage to the hair of the user, the hair shade for the user determined by employing the sensor 1 and the desired hair shade or the desired hair shades selected by the user, the processor 3 can produce a predicted hair shade image or a plurality of predicted hair shade images 12. The at least one predicted hair shade image 12 which is produced may, for example, be displayed on a display device by employing a wireless connection 5*b*. The at least one predicted hair shade image 12 may, for example, be superimposed on a recorded image of the hair of the user before a hair treatment on a display device and be combined, for example by using digital image processing.

The processor 3 can update the personalized information or personalized stored data stored in the memory. The updating of the personalized information may, for example, comprise overwriting previously stored hair condition information. The processor 3 can carry out the overwriting of previously stored hair condition information for each user, for example. In this manner, the processor 3 can, for example, replace a previous degree of damage to the hair determined during a previous hair condition measurement by a degree of damage to the hair which has been measured later, and store it in the memory. As an example, the processor 3 may replace a hair shade determined during a previous hair condition measurement with a hair shade measured later and store it in the memory.

A determination of hair condition information, for example a degree of damage to the hair and a hair shade for the user, by recording the hair condition 14*b* using a sensor after a hair treatment may be carried out as described for the determination of the hair condition information before a hair treatment. The hair condition determined after a hair treatment, for example a degree of damage to the hair and/or a hair shade, can be archived or stored for each user by the processor 3 in the memory 2.

Using the processor 3, the system 300 can carry out a comparison between a hair condition before a hair treatment and a hair condition after a hair treatment in order, for example, to improve the accuracy of the predicted or forecast or future hair condition. Thus, for example, a hair shade may be compared before and after a treatment and/or, for example, a degree of damage to the hair may be compared before and after a hair treatment.

Furthermore, the system 300 may carry out a comparison between a hair condition after a hair treatment with a predicted or forecast or future hair condition provided before the hair treatment, as illustrated diagrammatically by the reference numeral 15 in FIG. 3. Thus, for example, a hair shade after dyeing or bleaching the hair may be compared with a previously predicted hair shade.

Furthermore, for example, a degree of damage to the hair after a hair treatment with a cosmetic hair treatment agent, for example with a hair shampoo, a hair mask, a hair colouring agent or a hair oil, may be compared with a predicted degree of damage to the hair before the hair treatment.

A difference may be determined or calculated from the respective mutually compared values, for example hair shades or hair shade values and/or degrees of damage to the hair or the condition of damaged hair. The difference may, for example, be generated by subtracting one value from the respective other value. As an example, a determined hair condition after a hair treatment may be subtracted from the predicted hair condition before the hair treatment. In accordance with various exemplary embodiments, for example, a predicted hair condition before hair treatment may be subtracted from a determined hair condition after a hair treatment.

At least one item of hair condition information from a plurality of items of hair condition information may be reduced or increased in the memory 2 by a hair shade prediction update 16 by a respectively determined difference or a respectively determined distinction. As an example, a reduction in a logged value by a distinction which, for example, is generated from a comparison between the predicted hair condition information and the actual hair condition information after a hair treatment, may comprise an increase or a reduction in the respective logged value in the memory 2. In this manner, for example, a logged value in a memory cell of the database, for example on a server, a cloud, etc, may be reduced by a predefined value by a subtraction function or may be increased by a predefined value by an addition function. The value reduced by the determined difference or the value increased by the determined difference may be stored in the memory, for example in another memory cell, or be stored in the original memory cell, whereupon the previous logged value can be overwritten.

As a consequence, a system is made possible which, by employing a comparison of previous values with subsequent values, can improve an internal algorithm or an internal calculation model, for example for the determination of predicted hair conditions. As an example, the algorithm may be written in a source code. The accuracy of the system can increase as time goes by or as the number of before-after hair condition determinations increases. In this manner, the system can provide a counseling system which learns over time. By employing the system 300 which learns over time and the increase in accuracy, a more accurate prognosis for the user and consequently a greater user or client satisfaction after using cosmetic care agents and an increase in the effectiveness of the system 300 can be obtained.

Furthermore, the system 300 may be used to collect user-based hair condition information. Thus, the preferences of a user or a plurality of users in the areas of hair shades, cosmetic hair treatment products for use in the case of damage to the hair, etc, can be deduced from the historical data stored in the memory. In addition, the hair condition information stored in the memory 2 may be made available for statistical evaluations. The greatest possible use to the user is obtained by carrying out an analysis of the data.

Figure 4:
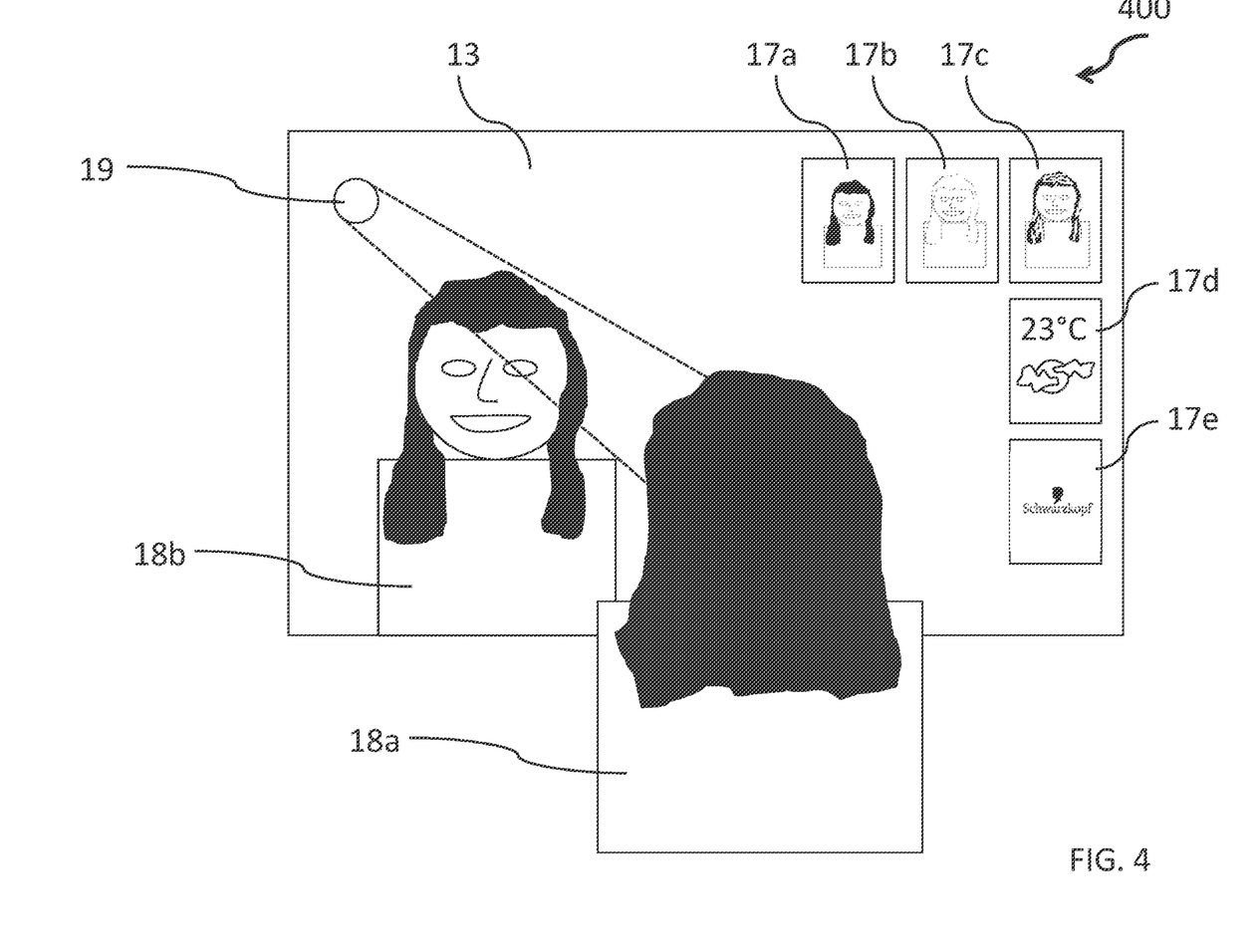
FIG. 4 shows a diagrammatic representation of component parts of a system for managing hair condition information in accordance with an exemplary embodiment.

FIG. 4 shows a diagrammatic representation of exemplary component parts 400 of a system 100, 200, 300 for managing hair condition information in accordance with an exemplary embodiment.

The systems 100, 200 and 300 described above may, for example, comprise component parts 400, as illustrated diagrammatically in FIG. 4. In various exemplary embodiments, a smart mirror may be used as a display device 13, for example in a professional hair studio. The smart mirror may comprise a combination of a conventional mirror and a digital screen. The conventional mirror and the digital screen may be superimposed. The conventional mirror can produce an instant mirror image 18b of a user 18a, as illustrated diagrammatically in FIG. 4. The digital screen may be configured to display at least one item of information 17 superimposed on the conventional mirror. As can be seen diagrammatically in FIG. 4, the information may, for example, include at least one item of predicted user-specific hair condition information 17a, 17b, 17c, for example at least one predicted hair shade or at least one image of the head of a user with a predicted hair shade. Thus, for example, user-specific hair condition information 17a may comprise a darker hair shade, user-specific hair condition information 17b may comprise a lighter hair shade and user-specific hair condition information 17c may comprise a combination of lightened and dark hair shades, for example streaks.

Furthermore, the smart mirror may show information which is of interest to the user such as, for example, weather information 17d or general or personalized advertising 17e. The advertising may in particular include innovations in the hair treatment or fashion fields. Furthermore, the smart mirror may be used in order to interactively show a cosmetic hair treatment product such as, for example, a hair shampoo, a hair treatment, a hair colouring agent, a hair mask or a hair oil, which can be mixed together in a manner which is selected by the user and which is tailored to the user. The information 17a to 17e shown by employing the smart mirror can be tailored to the respective user. Thus, for example, the weather information 17d may be provided for the actual location of the user. The personalized advertising 17e may, for example, offer a cosmetic hair treatment product which is dependent on the weather data. Thus, for example, in sunny weather, hair treatment products with UV protection could be offered.

In an exemplary embodiment, the smart mirror furthermore comprises a facial recognition camera 19 for identifying at least one face from a plurality of users stored in the memory 3. By employing the facial recognition camera 19, before counseling a user 18a, the user can be identified by capturing an area of the face of the user 18a. By employing familiar methods for identifying people by the person's face, the camera 19 can identify the respective person who, for example, is sitting in front of the smart mirror. After the facial recognition, user-specific information may be displayed via the smart mirror.

Figure 5:
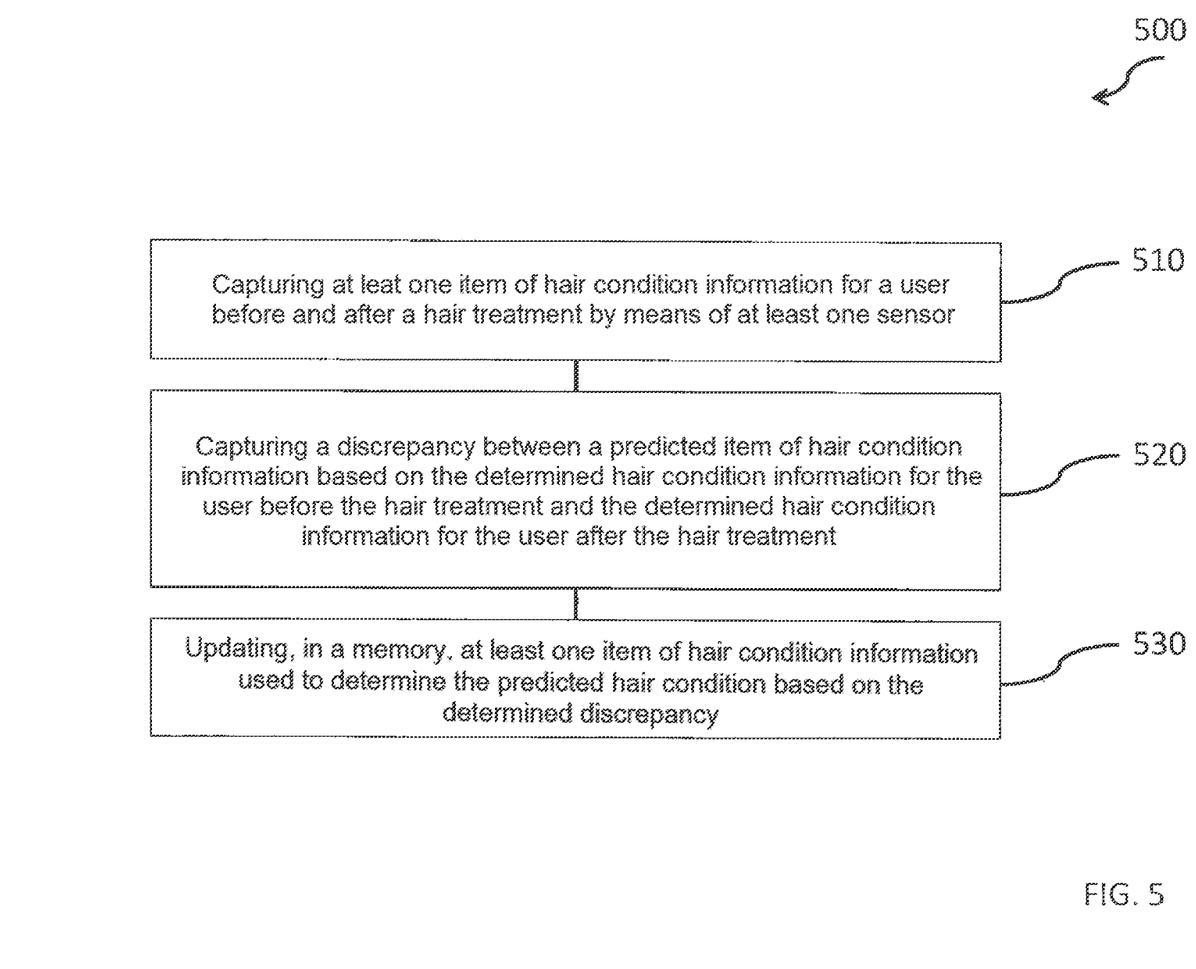
FIG. 5 shows a flow diagram illustrating a method for optimizing a cosmetic counseling system in accordance with an exemplary embodiment.

FIG. 5 shows a flow diagram that illustrates a method 500 for optimizing a cosmetic counseling system in accordance with an exemplary embodiment.

The method 500 comprises capturing, at 510, at least one item of hair condition information for a user before and after a hair treatment by employing at least one sensor. Furthermore, the method comprises capturing, at 520, a discrepancy between a predicted item of hair condition information based on the determined hair condition information for the user before the hair treatment and the determined hair condition information for the user after the hair treatment. The method also comprises, at 530, updating, in a memory, at least one item of hair condition information used to determine the predicted hair condition based on the determined discrepancy.

Various aspects of this disclosure will be illustrated below:

Exemplary embodiment 1 is a system for managing hair condition information. The system may have at least one sensor for determining an item of hair condition information for a user, a memory, wherein the memory is configured to store at least the item of hair condition information, and a processor, wherein the processor is configured to update at least one item of hair condition information in the memory based on a discrepancy between an item of hair condition information for a user determined by employing a sensor after a hair treatment and a predicted item of hair condition information for the user.

In exemplary embodiment 2, the subject matter of exemplary embodiment 1 may optionally include that the hair condition information comprises a degree of damage to the hair and/or a hair shade.

In exemplary embodiment 3, the subject matter of exemplary embodiments 1 or 2 may optionally include that the sensor comprises a near-infrared spectroscopy sensor (NIR sensor) and/or a camera and a colour calibration device.

In exemplary embodiment 4, the subject matter of exemplary embodiments 1 or 2 may optionally include that the sensor comprises a near-infrared spectroscopy sensor (NIR sensor) and/or a photometer.

In exemplary embodiment 5, the subject matter of exemplary embodiments 1 or 2 may optionally include that the sensor comprises a near-infrared spectroscopy sensor (NIR sensor) and/or a sensor for visible light (VIS sensor).

In exemplary embodiment 6, the subject matter of exemplary embodiment 1 may optionally include that the system furthermore comprises a display device for displaying at least information based on the hair condition information stored in the memory.

In exemplary embodiment 7, the subject matter of exemplary embodiment 6 may optionally include that the sensor is positioned in a mobile device and wherein the display device is positioned in the mobile device and/or in a smart mirror.

In exemplary embodiment 8, the subject matter of exemplary embodiment 7 may optionally include that an exchange of information is carried out between the mobile device and the memory by employing an application (app).

In exemplary embodiment 9, the subject matter of exemplary embodiments 1 to 8 may optionally include that the processor is further configured to compare a degree of damage to the hair of the user captured by employing the sensor before the hair treatment with a plurality of degrees of damage to the hair stored in the memory and/or to compare a hair shade for the user captured by employing the sensor before the hair treatment with a plurality of hair shades stored in the memory, to determine a closest degree of damage to the hair and/or closest hair shade stored in the memory and, based on the respectively determined closest degree of damage to the hair and/or the determined closest hair shade and a desired user's hair colour, to provide a predicted hair condition and/or predicted hair shade.

In exemplary embodiment 10, the subject matter of exemplary embodiments 1 to 9 may optionally include that the processor is further configured to determine a discrepancy between a hair shade determined by employing a sensor before a hair treatment or a predicted hair shade before a hair treatment with a hair shade determined by employing the sensor after a hair treatment by employing a comparison of respective associated hair shade values.

In exemplary embodiment 11, the subject matter of exemplary embodiments 1 to 10 may optionally include that the processor is further configured to allocate the hair condition information for the user captured by employing the sensor to the respective user in the memory.

Exemplary embodiment 12 is a method for optimizing a cosmetic counseling system. The method may comprise a determination of at least one item of hair condition information for a user by employing at least one sensor before and after a hair treatment, a determination of a discrepancy between a predicted item of hair condition information based on the item of hair condition information for the user determined by employing the sensor before the hair treatment and the hair condition information for the user determined by employing the sensor after the hair treatment, and based on the determined discrepancy, updating, in a memory, at least one of the items of hair condition information used in order to determine the predicted hair condition.

In exemplary embodiment 13, the subject matter of exemplary embodiment 12 may optionally include that the method furthermore comprises a comparison of the hair condition information for the user determined by employing the sensor before the hair treatment with the hair condition information for the user determined by employing the sensor after the hair treatment.

In exemplary embodiment 14, the subject matter of exemplary embodiment 13 may optionally include that the determination of an item of hair condition information for the user comprises a determination of a degree of damage to the hair by employing a NIR sensor and/or a determination of a hair shade for the user by employing a camera and a colour calibration device.

In exemplary embodiment 15, the subject matter of exemplary embodiment 14 may optionally include that the determination of the predicted hair condition information comprises a determination of the degree of damage to the hair of the user before the hair treatment and/or a determination of the hair shade for the user before the hair treatment, a comparison of the determined degree of damage to the hair with at least one of a plurality of degrees of damage to the hair stored in the memory and/or a comparison of the determined hair shade with at least one of a plurality of hair shades stored in the memory, a determination of a closest degree of damage to the hair and/or a closest hair shade which are stored in the memory, and a provision of a predicted hair shade based on the closest stored degree of damage to the hair and/or on the determined closest stored hair shade and/or on a pre-specified desired hair colour.

In exemplary embodiment 16, the subject matter of exemplary embodiments 12 to 15 may optionally include that the method further comprises displaying a predicted hair shade by employing a display device.

In exemplary embodiment 17, the subject matter of exemplary embodiment 12 may optionally include that the update comprises at least one update of a hair shade and/or of a condition of the damaged hair in the memory.

In exemplary embodiment 18, the subject matter of exemplary embodiment 16 may optionally include that the representation furthermore comprises information regarding a degree of damage, a degree of dryness and a lightening/decolorization of the hair.

In exemplary embodiment 19, the subject matter of exemplary embodiment 18 may optionally include that the representation comprises a graphical presentation of the information.

In exemplary embodiment 20, the subject matter of exemplary embodiment 12 may optionally include that possible desired hair colours may be provided on a display device, for example on a smart mirror, a smartphone, or a tablet.

In exemplary embodiment 21, the subject matter of exemplary embodiment 20 may optionally include that the provision furthermore comprises providing information from the field of hair treatment cosmetics and/or fashion trends and/or weather information.

In exemplary embodiment 22, the subject matter of exemplary embodiment 20 may optionally include that the provision comprises a provision of at least one user-specific hair treatment product, for example a hair care agent, a hair colouring agent, a hair styling agent or a hair bleaching agent.

In exemplary embodiment 23, the subject matter of exemplary embodiment 22 may optionally include that the method furthermore comprises a purchase recommendation and/or an offer to order the personalized user-specific hair treatment product via a mobile device, for example a smartphone, a smart mirror or a tablet.

In exemplary embodiment 24, the subject matter of exemplary embodiment 12 may optionally include that the memory comprises a database, a data server or a cloud.

In exemplary embodiment 25, the subject matter of exemplary embodiment 12 may optionally comprise saving the determined hair condition information in the memory.

In exemplary embodiment 26, the subject matter of exemplary embodiment 1 may optionally include that the processor is further configured to determine a hair colour result for a totality of the hair colour values stored in the memory based on a starting colour of the user's hair determined by employing the sensor.

In exemplary embodiment 27, the subject matter of exemplary embodiment 1 may optionally include that the system furthermore comprises a sensor, for example a camera, for the facial recognition of a user and the camera is accommodated on or in a smart mirror.

In exemplary embodiment 28, the subject matter of exemplary embodiment 12 may optionally include that the method furthermore comprises capturing a user's face by employing a camera and an identification of the user from a plurality of users in a memory.

In exemplary embodiment 29, the subject matter of exemplary embodiment 28 may optionally include that the method furthermore comprises a presentation of user-specific data based on the identification of the user.

Further advantageous embodiments of the method can be obtained from the description of the system, and vice versa.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A system for managing hair condition information, the system comprising:
    a sensor for determining hair condition information for a user, the hair condition information comprising a degree of damage to the user's hair and a hair shade of the user's hair;
    a memory in operable communication with the sensor and configured to store the hair condition information; and
    a processor in operable communication with the memory and configured to update the hair condition information in the memory based on a discrepancy between the hair condition information for the user after a hair treatment determined by using the sensor and a predicted hair condition information for the user,
    wherein the processor is further configured to:
        compare the degree of damage to the user's hair captured by the sensor before the hair treatment with a plurality of degrees of damage to the hair stored in the memory;
        compare the hair shade of the user's hair captured by the sensor before the hair treatment with a plurality of hair shades stored in the memory;
        determine a closest degree of damage to the user's hair and a closest hair shade which are stored in the memory;
        based on the respectively determined closest degree of damage to the user's hair and the determined closest hair shade and the user's desired hair shade, to provide (i) a predicted degree of hair damage, (ii) a predicted hair shade, and (iii) personalized cosmetic hair treatment product information; and
        transmit the personalized cosmetic hair treatment product information.

2. The system as claimed in claim 1,
    wherein the sensor comprises a near-infrared spectroscopy sensor (NIR sensor) and a camera and a colour calibration device.

3. The system as claimed in claim 1,
    wherein the sensor comprises a near-infrared spectroscopy sensor (NIR sensor) and a photometer.

4. The system as claimed in claim 1,
    wherein the sensor comprises a near-infrared spectroscopy sensor (NIR sensor) and a sensor for visible light (VIS sensor).

5. The system as claimed in claim 1,
    wherein the system further comprises a display device for the presentation of at least information based on the item of hair condition information stored in the memory.

6. The system as claimed in claim 5,
    wherein the sensor is positioned in a mobile device and wherein the display device is positioned in the mobile device, in a smart mirror, or a combination thereof.

7. The system as claimed in claim 6,
    further comprising an application (app) configured to exchange information between the mobile device and the memory.

8. The system as claimed in claim 1,
    wherein the processor is further configured to determine a discrepancy between the hair shade determined using the sensor before a hair treatment or a predicted hair shade before a hair treatment and the hair shade determined by using the sensor after a hair treatment by means of a comparison of respective associated hair shade values.

9. The system as claimed in claim 1,
    wherein the processor is further configured to allocate the hair condition information for the user captured by using the sensor to the respective user in the memory.

10. A method for optimizing a cosmetic counselling system, the method comprising the steps of:
    determining hair condition information for a user by using a sensor before and after a hair treatment, the hair condition information comprising a degree of damage to the user's hair and a hair shade of the user's hair;
    determining a discrepancy between predicted hair condition information based on the hair condition information for the user determined using the sensor before the hair treatment and the hair condition information for the user determined using the sensor after the hair treatment; and
    based on the determined discrepancy, updating, in a memory, the hair condition information used to determine the predicted hair condition,
    wherein the determination of the predicted hair condition information comprises:
        comparing the determined degree of damage to the user's hair with a plurality of degrees of damage to the hair that is stored in the memory,
        comparing the determined hair shade of the user's hair with a plurality of hair shades that is stored in the memory,
        determining a closest degree of damage to the hair that is stored in the memory,
        determining a closest hair shade that is stored in the memory, and
        providing a predicted hair shade based on the respectively determined closest stored degree of damage to the hair, the determined closest stored hair shade, and a predetermined desired hair colour, and
        based on the respectively determined closest degree of damage to the user's hair and the determined closest hair shade and the user's desired hair colour, providing (i) a predicted degree of hair damage, (ii) a predicted hair shade, and (iii) personalized cosmetic hair treatment product information, and
    wherein the method further comprises:
        transmitting the personalized cosmetic hair treatment product information to a dispensing station; and
        producing, in the dispensing station, a personalized hair treatment product based on the personalized cosmetic hair treatment product information.

11. The method as claimed in claim 10, wherein the method further comprises a comparison of the hair condition information for the user determined using the sensor before the hair treatment with the hair condition information for the user determined using the sensor after the hair treatment.

* * * * *